United States Patent
Sesnowitz et al.

(10) Patent No.: US 11,449,726 B1
(45) Date of Patent: *Sep. 20, 2022

(54) TAILORED ARTIFICIAL INTELLIGENCE

(71) Applicant: PROGRESSIVE CASUALTY INSURANCE COMPANY, Mayfield Village, OH (US)

(72) Inventors: Craig S. Sesnowitz, Chagrin Falls, OH (US); Geoffrey S. McCormack, Shaker Heights, OH (US); Rama Rao Panguluri, Aurora, OH (US); Robert R. Wagner, Fairview Park, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/936,819

(22) Filed: Jul. 23, 2020

Related U.S. Application Data

(63) Continuation of application No. 16/452,121, filed on Jun. 25, 2019, now Pat. No. 10,733,497.

(51) Int. Cl.
| | |
|---|---|
| *G10L 15/00* | (2013.01) |
| *G10L 15/26* | (2006.01) |
| *G06N 3/00* | (2006.01) |
| *G06F 40/56* | (2020.01) |
| *G06F 40/30* | (2020.01) |
| *G06N 3/12* | (2006.01) |

(52) U.S. Cl.
CPC ............ *G06N 3/006* (2013.01); *G06F 40/30* (2020.01); *G06F 40/56* (2020.01); *G06N 3/126* (2013.01)

(58) Field of Classification Search
CPC ...... G06N 3/0454; G06N 3/086; G06N 20/00; G06N 3/126; G06N 3/02; G06N 3/006; G06K 9/6267; G10L 15/02; G10L 15/063; G10L 15/08; G10L 15/144; G10L 15/26; G10L 2015/0635; G10L 2015/228; G10L 25/30; G06F 40/00; G06F 40/56; G06F 40/30
See application file for complete search history.

(56) References Cited

U.S. PATENT DOCUMENTS

| | | | |
|---|---|---|---|
| 7,756,800 B2* | 7/2010 | Chidlovskii | G06N 20/00 706/20 |
| 10,445,431 B1* | 10/2019 | Lev-Tov | G06N 3/08 |
| 2019/0295000 A1* | 9/2019 | Candel | G06N 5/003 |

* cited by examiner

*Primary Examiner* — Michael Ortiz-Sanchez
(74) *Attorney, Agent, or Firm* — Lempia Summerfield Katz LLC

(57) ABSTRACT

A system and method determine a classification by simulating a human user. The system and method translate an input segment such as speech into an output segment such as text and represents the frequency of words and phrases in the textual segment as an input vector. The system and method process the input vector and generate a plurality of intents and a plurality of sub-entities. The processing of multiple intents and sub-entities generates a second multiple of intents and sub-entities that represent a species classification. The system and method select an instance of an evolutionary model as a result of the recognition of one or more predefined semantically relevant words and phrases detected in the input vector.

21 Claims, 7 Drawing Sheets

TAILORED ARTIFICIAL INTELLIGENCE

PRIORITY CLAIM

This application is a continuation of U.S. patent application Ser. No. 16/452,121 filed Jun. 25, 2019, now U.S. Pat. No. 10,733,497, which is incorporated by reference in its entirety.

BACKGROUND OF THE DISCLOSURE

Technical Field

This disclosure relates to linguistic analysis and specifically to biometric systems that recognize characteristics conveyed through an input to render automated classifications.

Related Art

Text messages and speech are common forms of communication. A text message can express opinions and thoughts through short messages; share ideas and expressions through email, and provide access to services through web pages. Both text messages and speech are rich sources of information that may provide insights into the personality, characteristics, and needs of the communicators. Deconstructing text messages and speech and extracting information from them is challenging because neither is structured nor organized. Text messages takes many forms like speech; it is difficult to classify, and thus difficult to automate, especially when transacting services.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate corresponding parts throughout the different views.

DETAILED DESCRIPTION

An automatic recognition system uses biometrics to recognize characteristics conveyed in messages and/or speech. Speech is a spoken input to the automatic recognition system in an aural range. It may be a single word, an entire phrase, a sentence or several sentences. The systems and methods (referred to as systems or services) derive insights from free-form input and generate and train deep-learning and/or machine-learning models such as classification models. Using an application programing interface (API) and a translator, the system translates natural and/or synthesized text (e.g., via a speech-to-text synthesis) into feature groups that are processed by statistical, functional, and/or neural network models in a distributed architecture. Recognitions are made even when resources are limited. In some systems, recognition events are refined by evolutionary models, such as one or more exemplary classification evolutionary models. The recognition may comprise a recognition of a request or a response to an inquiry, such as a request for a composite business classification that is based on consumer classifications and/or industrial classifications. An industrial classification may be based on the North American Industry Classification System Index Classification or NAICS system.

The automatic recognition systems simulate human dialogue. The systems learn user preferences and provide users with suggestions such as to how to navigate self-service channels on a user device or through a processing node. Segmentations generate the predictions that provide access to restricted content or select underwriting and deliver targeted messages such as a predicted business classification that provides access to one or many insurance carriers, for example. The systems use natural language processing models and/or evolutionary models to render one or more intents and sub-entities. An intent generally refers to an interpreted aim or purpose of a communication. Its sub-entities provide context of that communication often in a graduated or hierarchical order. In an insurance quoting application, an intent may represent a detailed classification of a business requesting insurance coverage.

Figure 1:
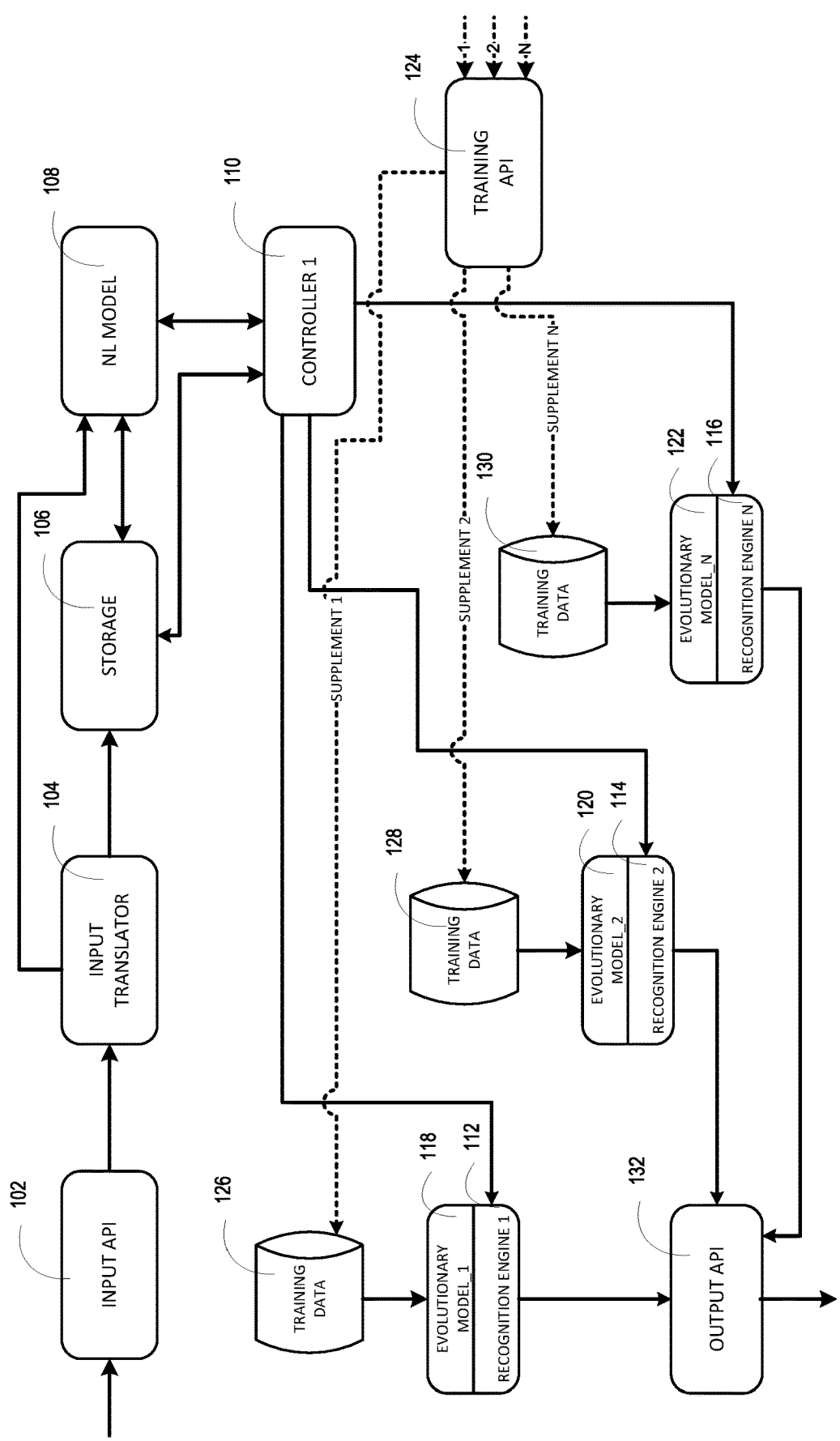
FIG. 1 is a system that emulates human users that engage in conversations with human users.

In FIG. 1, an automatic recognition system receives speech and/or text input through an API 102. A speech-to-text synthesis translates speech into text through a translator 104. The text is translated into feature sets that are represented by vectors. The vectors represent the frequency of words and phrases within a text or textual frame or segment. It is processed by a natural language processing model 108 (also referred to as a natural language processing engine) and stored in a local or a distributed database (e.g., a memory). In FIG. 1, select semantically relevant words and phrases (e.g., that express a user's intent and convey contextual meaning) detected in the input vector by the natural language processing model 108 are chosen and marked as designation words and/or designation phrases. Designation words and/or designation phrases uniquely identify evolutionary models that are selected by the controller 100 to validate, distill, and/or further process the input vector and/or natural language model's intents and sub-entity recognition results. An evolutionary model is a model that processes the natural language model's 108 intents and sub-entity recognition results and/or the speech and/or text input, which may be vectorized. An evolutionary model generates species' predictions and processes intents and sub-entities that are particular or unique to a sub-category. A species ranks below a genus or subgenus in a particular domain. A genus ranks below a family but above a species. It consists of a group exhibiting similar characteristics. In a risk mitigation context, for example, a family may comprise insurance carrier products and services, a genus may comprise an on-line insurance quoting domain, an on-line insurance servicing domain, an on-line claims processing domain, and/or etc. In a risk mitigation context, a sub-genus may comprise a general business classification that best describes the business, and a species may comprise an NAICS classification that best describes that business.

The accuracy of a recognition event is measured by a first confidence score generated by the natural language processing model 108 that quantitatively represents the correctness of the prediction made by the natural language processing model 108. When the first confidence score equals or exceeds a predetermined threshold, a controller 110 transfers the input vector and/or natural language recognition results to the one of more recognition engines 112-116 that host the evolutionary models 118-122. There are one or multiple recognition engines 112-116 and evolutionary models 118-122 (that is shown by the N designation in the drawings) via controller 100. If the first confidence score is below a predetermined threshold, the controller 110 may direct the natural language processing model 108 to re-execute the recognition event, or select another natural language processing model or vocabulary in alternate systems, to re-execute the recognition event. If the deficiency persists, controller 110 reports the deficiency by transmitting an alert to a user or IT specialist, sets a flag, and/or may prompt the user to re-enter the input via an alert device 602 (shown in FIGS. 6 and 7) before re-executing the recognition event. A flag is a state or a signal indicating the existence or status of a particular condition. A controller is a hardware device or processor that actuates and/or directs the devices it controls, or is capable of making decisions with respect to the operation or actuation of the devices it controls, including being operable to selectively sequence their operation, enable and disable and/or select prediction models and/or vocabularies and active grammars, and/or delay recognition and/or training operations. In FIG. 1, controller 100 is a hardware device or processor that actuates and/or directs the operation of the recognition engines 112-116, or is capable of making decisions with respect to the operation or actuation of the recognition engines 112-116 including being operable to selectively sequence their operation, enable and disable the evolutionary models 118-122 they serve or host, and/or delay recognition and/or training operations.

Some recognition engines load two or more or all of the instances of the evolutionary models 118-122 that controller 110 independently enables or disables to modify or execute recognition event sequences and behavior. The loading and parallel execution of two or more evolutionary models 118-122 improves recognition capacity, by among other things enabling the controller 110 to shift work and balance processing loads. By enabling one or more recognition engines to take over for one or more of all of the recognition engines 112-116, the system enhances network stability, minimizes or eliminates downtime caused by recognition engine or evolutionary model failures, and ensures that the recognition engines 112-116 work in a unified way that is seamless to the user. Since the enablement and disablement of the evolutionary models 118-122 occurs independently of their loading, the recognition system can preserve processing resources by enabling its evolutionary models 118-122 only when they are needed.

In FIG. 1, the enablement of one or more evolutionary models 118-122 is based on one or many factors. In some systems it is based on the availability of post-processing applications, in others, the degree or levels of the classifications (e.g., the number of sub-classifications made in a hierarchical or flat classification model, for example), and in others the number of operating domains (e.g., such as how many insurance quoting domains are in use, how many on-line insurance servicing domains are in use, and/or how many on-line insurance claims processing domains are in use) the recognition system is servicing, and in others, the requested granularity of the predictions, etc.

To ensure that the evolutionary models 118-122 are generated from the best words and phrases within a domain, machine-learning and/or deep-learning algorithms are used to iteratively train and update machine learning and/or deep learning-based models by training on training data passed through the training API 124 and stored in memory 126-130. By removing less frequently recognized words and phrases, generic terms that do not conjure definite recognitions, and/or words and/or phrases that produce high error rates from the training sets and replacing them or supplementing them iteratively with semantically significant words and phrases that have higher recognition accuracy rates, the systems produce evolutionary models 118-122 with higher fitness and accuracy rates. In some training sessions, the training terms are vectorized (if not previously vectorized) and the scalar functions associated with the vector variables adjusted by a weighting function. A weighting function give some words and phrases in the training vector more "weight" or influence than other words and phrases. Weights may be adjusted based on word and phrase counts captured in the training dataset, their use by the content or service providers (e.g., the insurance carriers), empirical analysis of higher recognition accuracy rates, and/or based on their associations with pre-identified intents and sub entities. The training may occur on a synchronous schedule or in response to an asynchronous event, which may occur, for example, in response to a request or when one or more of confidence scores fall below a predetermined threshold. The term "algorithm" generally refers to a set of instructions that are followed to carry out a particular task. The term encompasses devices that render models that impersonate human behaviors, such as recognizing words, phrases, and/or generating authentic human-like replies automatically in response to recognition results.

The accuracy of an evolutionary recognition event is measured by a second confidence score generated by one or more of the recognition engines 112-116 made by the one or more evolutionary models 118-122 it is hosting. The second confidence score quantitatively represents the correctness of the evolutionary model's prediction. When the second confidence score equals or exceeds a predetermined threshold, the controller 110 transfers the second recognition results through an output API 132 to a second controller, such as the disseminating controller 202, for example, shown in FIG. 2. If the second confidence score is below the predetermined threshold, the controller 110 may direct one or more of the recognition engines 112-116 to re-execute the recognition event and/or select an alternate evolutionary model to re-execute the recognition event. If the deficiency persists, controller 110 reports the deficiency by transmitting an alert or setting a flag and/or prompt the user to re-enter the input via an alert device 602 (shown in FIGS. 6 and 7) before re-executing the entire recognition event or some of the recognition events executed by the recognition engines 112-116 (evolutionary models 118-122) and/or the natural language processing model 108.

Figure 2:
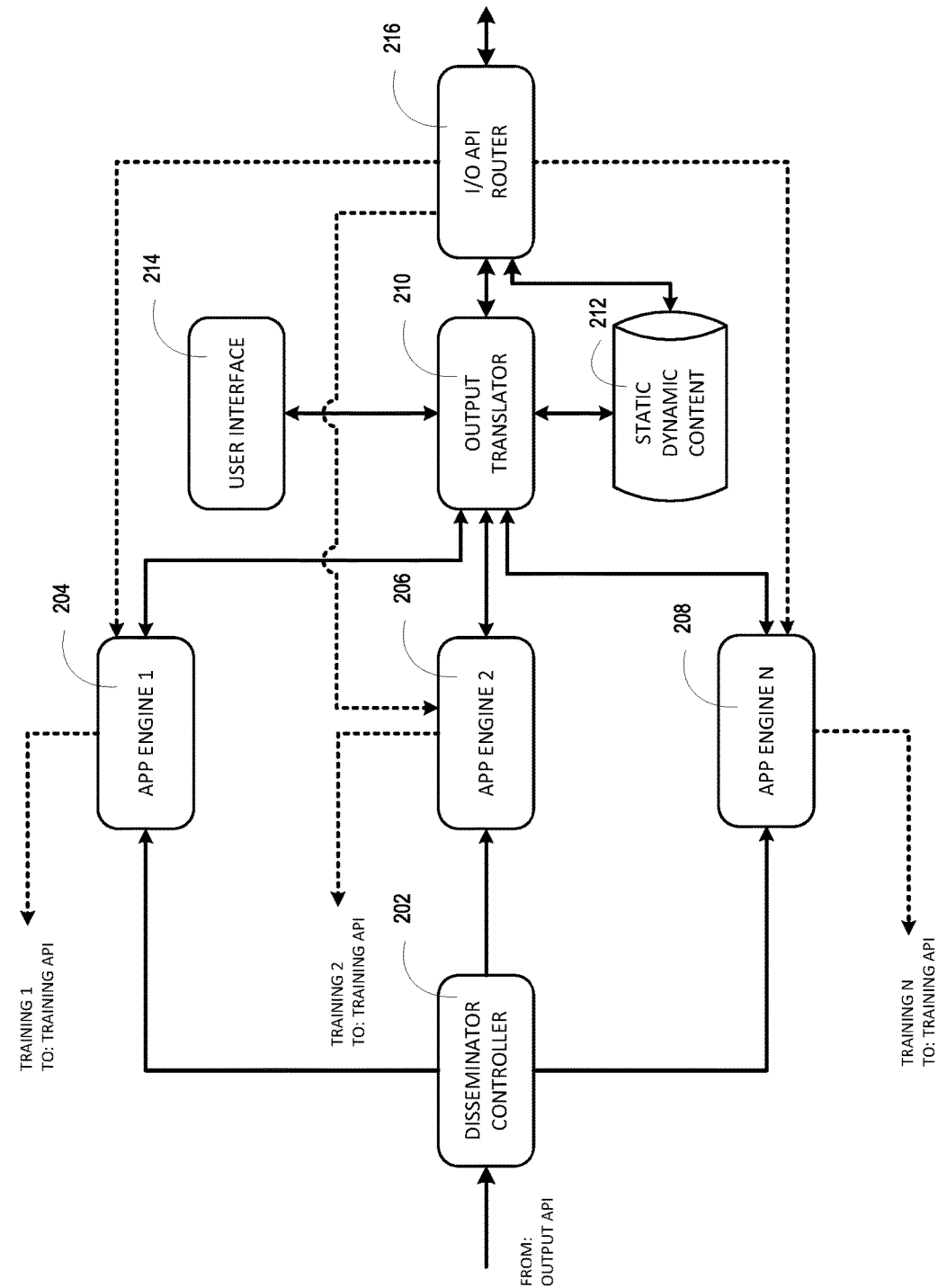
FIG. 2 is part of the system that emulates human users that engage in conversations with human users of FIG. 1.

In FIG. 2, the disseminator controller 202 receives the evolutionary models 118-122 and/or the natural language processing model 108 recognition results, and/or in some instances the input vector, and routes them to one or several application engines 204-208. The application engines 204-208 are genus and species experts. There are one or more application engines 204-208 that can be independently loaded and independently enabled or disabled in one device or multiple devices by the disseminator controller 202, like the process described above where the evolutionary models 118-122 are independently loaded and the controller 110 independently enables and disables the evolutionary models 118-122. The application engines 204-208 interpret and act upon the intent and its sub-entities generated by the recognition engines 112-116, the evolutionary models 118-122, and/or the natural language processing model 108. In an insurance context, application engines 204-208 may serve a quoting system, a claims processing system, and an on-line insurance servicing system that services existing insurance policies, respectively, for example.

In FIG. 2, some application engine selections are not based exclusively on comparisons of the intent and sub-entity combinations to predefined intent and sub-entity combinations. As such, some application selections constitute an improvement over traditional matching and threshold comparisons used for routing, as some disseminator controllers 202 also interpret users' intentions in contexts by considering words and phrases that surround a word or passage recognized and/or represented in the input vector too. The inclusion of a sub-textual context analysis in the disseminator controller 202 through a rule-based system, for example, enables a more flexible, nuanced, and accurate routing that can easily be tailored to the recognition system policies or customized to its user types. A rule-based system may further classify the vectors into organized groups by applying a set of predefined linguistic rules that consider the words that surround the recognized words and phrases. Further, access to contexts at a post-recognition level improves the accuracy and operation of the recognition system as it can validate the routing of the recognition results and input vector by comparisons to previously processed input vectors, intents, and sub-entities exhibiting similar characteristics. As a result, fewer interactions occur with the user, which enhances computer efficiency and reduces the power consumption of the recognition system.

In FIG. 2, the disseminator controller 202 routes the recognition results, and in some instances, the input vector to one or several application engines 204-208. The distributed applications engines 204-208 or unitary application engine (not shown) execute coordinate function, tasks, or activities in response to and for the benefit of the user. In FIG. 2, the application engines 204-208 consume the recognition results and/or the optional input vector and provide application specific content, responses, or application specific control signals to the output translator 210 that accesses a memory 212 of static and/or dynamic content and render output via a user interface, such as a graphical user interface (GUI) 214 shown in FIG. 2.

In an insurance quoting context, for example, generating a business classification can be challenging because there can be over nineteen thousand different sets of business classes that determine which insurance carrier can underwrite or disqualify an applicant's business based on the business' classification. So, after processing business descriptions collected through the GUI 214 that represents and/or collects content and files by means of icons, menus, and text-based or voice-enabled dialog boxes, some recognition systems deliver suggestions that identify the correct business classification of an applicant's business that may be validated or rejected by the user through GUI 214.

If rejected, the user is prompted to identify a business classification that best describes their business. To learn from that identification, the identified business classification is associated with the user's previously entered free-form input. Application engines 204-208 parse the association by selecting and extracting predefined semantically relevant words and phrases (e.g., not generic terms that do not conjure recognitions on their own) which are translated into a training vector (e.g., separate training vectors for each business classification) or maintained as one or more textual associations. The training vectors and textual associations are automatically returned to the evolutionary models 118-122 via the training API 124. The newly generated training vectors and textual associations supplement or replace the training data sets.

Figure 3:
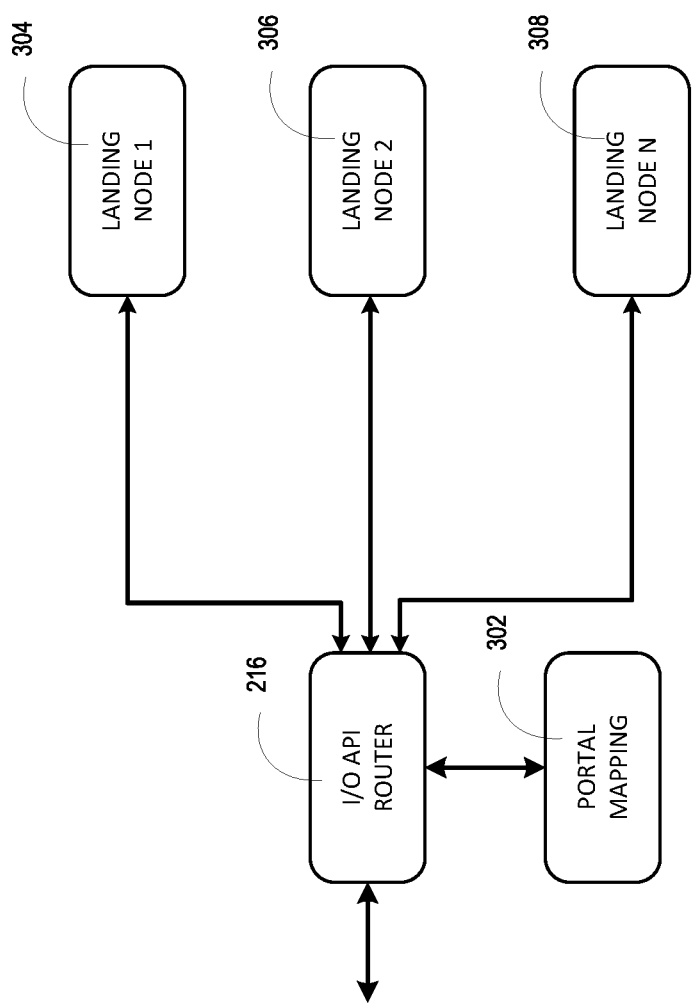
FIG. 3 is part of the system that emulates human users that engage in conversations with human users of FIG. 1.

If a predicted business classification is validated by a user, the bridge router 216 shown in FIGS. 2 and 3 relying on a routing table 302 sends the user to a destination via hyperlinks, framing, or a transclusion. In an insurance quoting context, the landing nodes 304-308 may be served by one or more different insurance carriers that can underwrite the applicant's business based on the predicted business classification. The underwriting process may be carried out via GUI 214 and the various insurance carriers serving the landing nodes 304-308.

Alternatively, the landing nodes and/or input API 102 may converse with the user through a synthesized and/or impersonated voice and/or emulated audio and/or text, in which a text-to-speech synthesis translates text into a synthesized or impersonated voice having a synthesized pitch through a third translator (not shown). For example, a linguistic model may generate synthesized and impersonated voices by representing a speaker through a predetermined number of pitch scales and concatenation elements that comprise a finite set of symbols that are based on human speech recordings. For example, a linguistic model may be based on recordings by Ms. Stephanie Courtney, the actress who portrays the upbeat fictional store employee "Flo" who sells insurance for Progressive Insurance in Progressive's marketing campaigns. Ms. Stephanie Courtney audio may be represented by a finite set of phonemes that are associated with a synthesized pitch and tone scale generated via an empirical analysis and stored in memory.

A phoneme is a unit of sound, such that in the same way textual words are made up of letters, natural and synthesized voices are made up of various phonemes. For instance, the word "good" is comprised of three phonemes—the "g" sound, the "oo" sound, and the "d" sound but composed of four letters. A voice synthesizer accessing a database joins various phonemes together to render an utterance when the letter combinations that are associated with various phonemes in the database match the desired words of the output.

Assuming an average speaking rate, a human sounding voice may be generated and delivered over a network when the phonemes and their associated pitch and tone and lengths are processed. Thus, in response to an exchange with one or more insurance carriers serving landing nodes 304-308 or an exchange with the input API 102, a synthesized Flo may respond with her very own synthesized voice and Flo-isms that model her traits, pitch and tone via an I/O, a synthesized anthropomorphic gecko like The Gecko pitching insurance for GEICO may respond with its own synthesized voice and traits, pitch, tone, and surreal humor and satirical terms and phrases that are unique to The Gecko via another I/O, and a synthesized Mr. Mayhem, the fictional character pitching insurance for Allstate may respond using his own synthesized voice and traits, pitch, tone, and select words, phrases, that distinguish his personality from others via another I/O. Flo-isms, The Gecko's surreal humor, and Mr. Mayhem's delight in causing chaos and damage, for example, make the impersonated synthesized voices that serve the recognition systems distinctive and unique.

The symbols and programming logic that model these traits may be stored in a plurality of unique files in a database and are selectable and executable by the server or cluster hosting the input API 102 and/or landing nodes 304-308. Further, some I/Os and landing nodes 302-308 will also disperse filler words like the word "um" in the synthesized and/or impersonated voice(s) to ensure that the voice(s) sounds even more authentic. The integration and placement of the filler words in an output may be based on the length of the audio segment, as part of an initial response to an inquiry, based on the transition to a different topic during a session, and/or based on empirical observations of the actors that portray the characters. The server or cluster serving the recognition systems translate the output via the vocabularies, pitch and tone libraries, and synthesized mannerisms that model the spokespersons or lizard that sell insurance.

Figure 4:
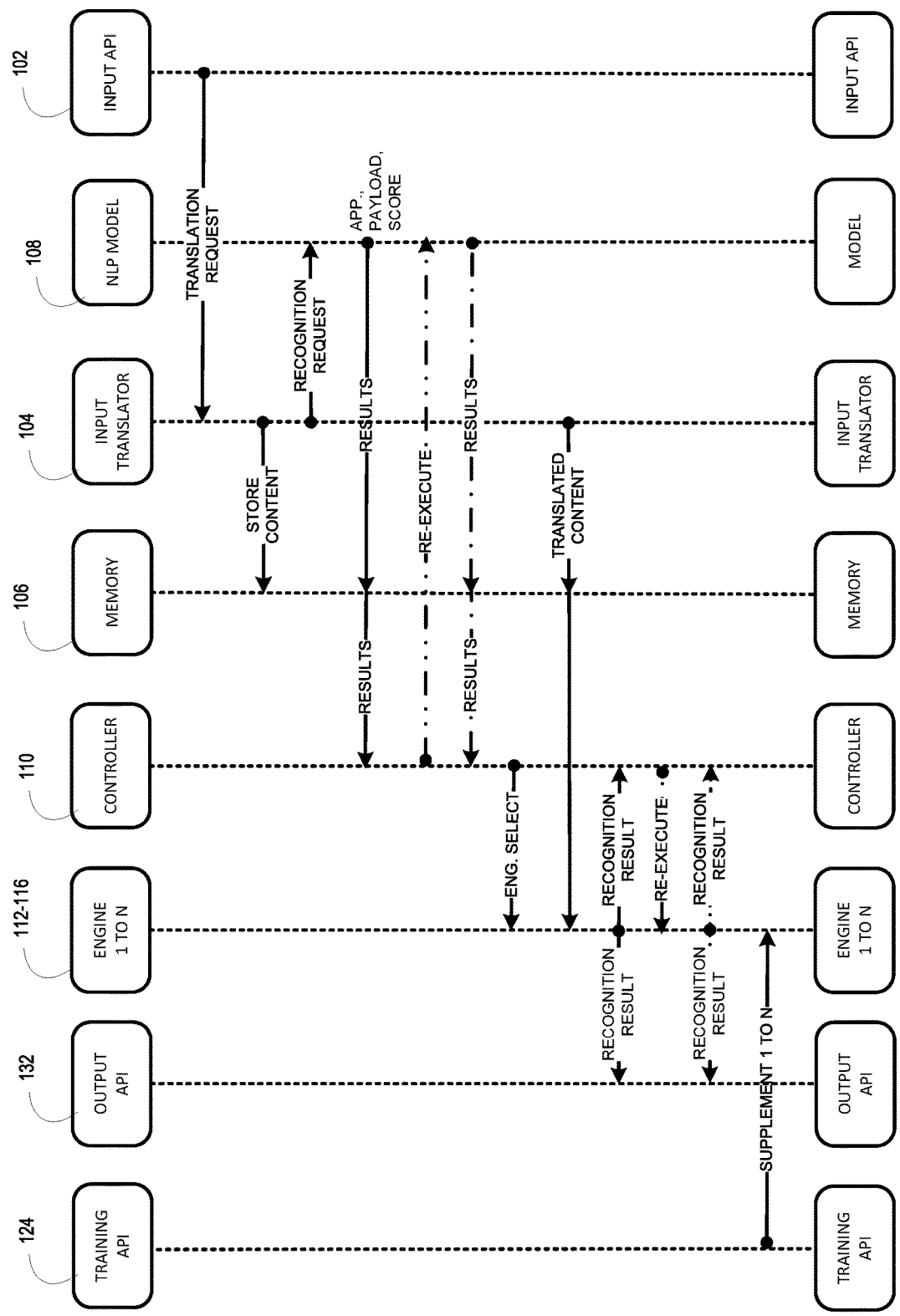
FIG. 4 is a process flow emulating human users engaging in conversations with human users.

In FIG. 4 a natural language processing and evolutionary model processing is used to processes speech, text, and provide responses that emulate human dialogue. The process begins when a translation request is received in speech and/or text. A speech-to-text synthesis process translates speech into text through a translator 104. The text is translated into feature sets that are represented by input vectors. The input vectors represent the frequency of words and phrases within a text or textual frame or segment. It is processed by a natural language processing model 108 in response to a recognition request and stored in a local or distributed database (e.g., a memory). In FIG. 4, select words and phrases detected in the input vector by the natural language processing model 108 are marked as designation words and/or designation phrases that uniquely identify evolutionary models 118-122 that are selected by the controller 110 to validate and distill the recognized input.

The accuracy of the initial recognition event is measured by a first confidence score generated by the natural language processing model 108 that quantitatively represent the correctness of the prediction made by the natural language processing model 108. When the first confidence score equals or exceeds a predetermined threshold, a controller 110 transfers the input vector and/or natural language recognition results to the one of more recognition engines 112-116 that host the evolutionary models 118-122 through an engine request. If the first confidence score is below a predetermined threshold, the controller 110 may direct the natural language processing model 108 to re-execute the recognition event, or selects another natural language processing model to re-execute the recognition event (as shown by the dashed lines). If the deficiency persists, controller 110 reports the deficiency by transmitting an alert to a user or IT specialist, sets a flag, and/or may prompt the user via an alert device 602 to re-enter the input before re-executing the recognition event (not shown). A flag is a state or a signal indicating the existence or status of a particular condition.

Some recognition engines load two or more or all of the instances of the evolutionary models 118-122 that controller 110 independently enables or disables to modify or execute recognition event sequences and behavior. The loading and parallel execution of two or more evolutionary models 118-122 improves recognition capacity of the process, by among other things enabling the controller 110 to shift work and balance processing loads. By enabling one or more recognition engines to take over for one or more or all of the recognition engines 112-116, the process enhances network stability, minimizes or eliminates downtime caused by recognition engine failure, and ensures that the recognition engines 112-116 work in a unified manner that is seamless to the user. Since the enablement and disablement of the evolutionary models 118-122 occurs independently of their loading, the recognition process preserves processing resources by enabling its evolutionary models 118-122 only when they are needed.

In FIG. 4 the enablement of one or more evolutionary models 118-122 is based on one or many factors. In some processes it is based on the availability of post-processing applications; in others, the degree or levels of the classifications (e.g., the number of sub-classifications made in a hierarchical or flat classification model, for example); and in others the number of operating domains (e.g., such as the number of insurance quoting domains, the number of on-line insurance servicing domains, the number of on-line insurance claims processing domains, for example) the recognition processes are servicing; and in others the requested or expected granularity of the prediction, etc.

To ensure that the evolutionary models 118-122 are generated from the best words and phrases within a domain's knowledge, machine learning or deep learning algorithms are used to iteratively train and update machine learning and deep learning-based models by training on training data passed through the training API 124 and stored in memory 126-130. By removing less frequently recognized words and phrases, generic terms that do not conjure definite recognition, and/or those that produce the highest error rates from the training sets and replacing them or supplementing them with semantically significant words and phrases that have higher recognition accuracy rates, the systems produce next generation evolutionary models 118-122. The next generation of evolutionary models 118-122 increase the fitness and accuracy of the predictions and may be brought on line while the models they will replace process input. Once a recognition event ends, the evolutionary models 118-122 may be substituted out.

In some training processes, the training terms are vectorized and the scalar functions adjusted by a weighting function that give some words and phrases in the training vector more "weight" or influence than other words and phrases. Weights may be adjusted based on word and phrase counts captured in the training dataset, their use by the content or service providers, empirical analysis of higher recognition accuracy rates, or based on their associations with pre-identified intents and sub entities. The training may occur on a synchronous schedule or in response to an asynchronous event, which may occur, for example, in response to a request or when one or both of confidence scores falls below a predetermined threshold.

The accuracy of an evolutionary recognition event is measured by a second confidence score generated by one or more of the recognition engines 112-116 made by the one or more evolutionary models 118-122 it is hosting. The second confidence score quantitatively represents the correctness of the evolutionary model's prediction. When the second confidence score equals or exceeds a predetermined threshold, the controller 110 transfers the second recognition results through an output API 132 to a second controller, such as the disseminating controller 202, for example, shown in FIG. 5. If the second confidence score is below the predetermined threshold, the controller 110 may direct one or more of the recognition engines 112-116 to re-execute the recognition event and/or select an alternate evolutionary model to re-execute the recognition event (as shown via the dashed lines). If the deficiency persists, controller 110 reports the deficiency by transmitting an alert or setting a flag and/or prompts the user to re-enter the input via the alert device 602 before re-executing the entire recognition event or some of the recognition events executed by the recognition engines 112-116 (evolutionary models 118-122) and/or the natural language processing model 108.

Figure 5:
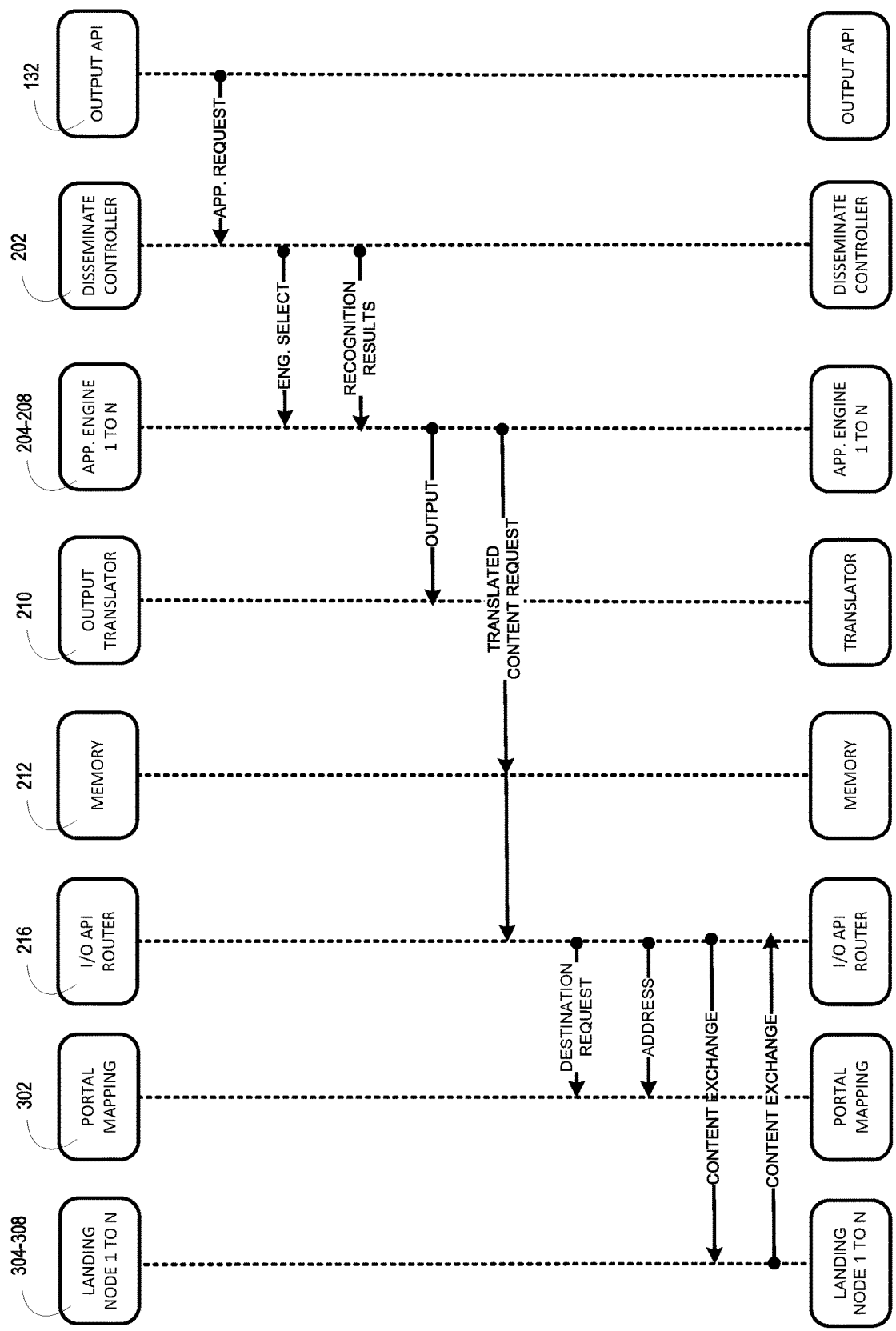
FIG. 5 is part of the process flow emulating human users engaging in conversations with human users of FIG. 4.

In FIG. 5, the disseminator controller 202 receives the evolutionary models 118-122 and/or the natural language processing model 108 recognition results, and/or in some instances the input vector, and routes them to one or several application engines 204-208. The application engines are the genus and species experts. There are one or more application engines 204-208 that are independently enabled or disabled by the disseminator controller 202 like the controller 110 enables and disables the evolutionary models 118-122 described above. The application engines 204-208 interpret and act upon the intent and its sub-entities generated by the recognition engines 112-116 (evolutionary models 118-122) and/or the natural language processing model 108. In an insurance context, application engines 204-208 may serve a quoting process, a claims processing process, and an on-line insurance servicing process, for example.

In FIG. 5, some application engine selections are not based exclusively on comparisons of the intent and sub-entity combinations to predefined intent and sub-entity combinations. As such, some application selections constitute an improvement over traditional matching and threshold comparisons used for routing as some disseminator controllers 202 also interpret users' intentions in contexts by considering words and phrases that surround a word or passage recognized and/or represented in the input vector too. The inclusion of a sub-textual context analysis in the disseminator controller 202 through a rule-based system, for example, enables a more flexible, nuanced, and accurate routing that can easily be tailored to the recognition system policies, or customized to its user types. A rule-based system may further classify the vectors into organized groups by applying a set of predefined linguistic rules that consider the words that surround the recognized words and phrases. Further, access to contexts at a post-recognition level improves the accuracy and operation of the recognition system as it can validate the routing of the recognition results and input vector by comparisons to previously processed input vectors, intents, and sub-entities exhibiting similar characteristics. As a result, fewer interactions occur with the user, which enhances computer efficiency.

In FIG. 5, the disseminator controller 202 routes the recognition results, and in some instances, the input vector to one or several application engines 204-208. The distributed applications engines 204-208 or unitary application engine (not shown) execute coordinate function, tasks, or activities in response to the user. In FIG. 5, the application engines 204-208 consume the recognition results and/or the optional input vector and provide application specific content, responses, or application specific control signals to the output translator 210 that accesses a memory 212 of static and/or dynamic content and render output via a user interface (not shown).

In an insurance quoting context, for example, generating a business classification can be challenging because there can be over nineteen thousand different sets of business classes that determine which insurance carrier can underwrite or disqualify an applicant's business based on the business' classification. So, after processing business descriptions collected through the GUI 214 that represents and/or collects content and files by means of icons, menus, and text-based or voice-enabled dialog boxes, some recognition systems deliver suggestions that identify the correct business classification of an applicant's business that may be validated or rejected by the user through GUI 214.

If rejected, the user is prompted to identify a business classification that best describes their business. To learn from that identification, the identified business classification is associated with the user's previously entered free-form input. Application engines 204-208 parse the association by selecting and extracting predefined semantically relevant words and phrases (e.g., not generic terms that do not conjure recognitions on their own) which are translated into a training vector (e.g., separate vectors for each business classification) or maintained as one or more textual associations. The training vectors and textual associations are automatically returned to the evolutionary models 118-122 via the training API 124. The newly generated training vectors and textual associations supplement or replace the training data sets.

If a predicted business classification is validated by a user, the bridge router 216 shown in FIGS. 2 and 3 relying on a routing table 302 sends the user to a destination via hyperlinks, framing, or a transclusion. In an insurance quoting context, the landing nodes 304-308 may be served by one or more different insurance carriers that can underwrite the applicant's business based on the predicted business classification. The underwriting process may be carried out via GUI 214 and the various insurance carriers serving the landing nodes 304-308.

In the systems and processes described above, deep-learning algorithms train and evaluate the fitness of the neural networks that comprise one or more natural language models 108 and one or more evolutionary models 118-122. An exemplary neural network may comprise one or more operating layers, including convolution layers, pooling layers, normalization layers, rectified linear unit layers, etc. or any other layer that may be used in a neural network. A current layer's input/output dimensions may limit the selected hyperparameters of a layer to ranges that fall within other ranges that can be processed by the input of a subsequent layer. A next layer's input dimensions may be determined after hyperparameters of an immediately preceding layer are defined, which modifies the amount of data that can flow to the backend of the neural network models. By applying limiting rules, a constraint is generated, tracked by the training cluster, stored in memory, and applied by the training cluster to ensure that changes in a preceding layer or changes in the sequence of the layers is compliant with the next layer that directly follows it in terms of input and output object transfers and functions, and cascades the requirements through the backend layers.

The training process begins with the receipt of the training data and natural language models 108 and/or evolutionary models 118-122 to be trained. An extraction and translation process transform a portion of the training data described above into training vectors (if not transformed into training vectors earlier) and the other or remaining portion of the supplemented or conditioned training data into evaluation vectors used to validate the trained models (e.g., usually a seventy-five to twenty-five percent split). The vectors may be based on the frequency of words in each of the input training frames or segments. Applying an iterative learning process, such as a stochastic gradient descent learning, some or all of the weights, layer sequences, and/or layer parameters of the neural network models are adjusted to minimize a loss function. Training may be limited to a fixed number of training cycles, periods of time, and/or until the neural network exceeds a fitness threshold.

The trained neural network is evaluated at the training cluster by processing the evaluation vectors that are separate from and different from the training vectors. Based on the trained neural network's performance, the training cluster calculates a fitness value by executing the evaluation vectors. In some applications, a user or application defines the acceptable fitness level. When the fitness level is reached, the respective natural language models and/or evolutionary models 118-122 are trained and may enter service in the systems and processes at the end of a recognition cycle or session.

Figure 6:
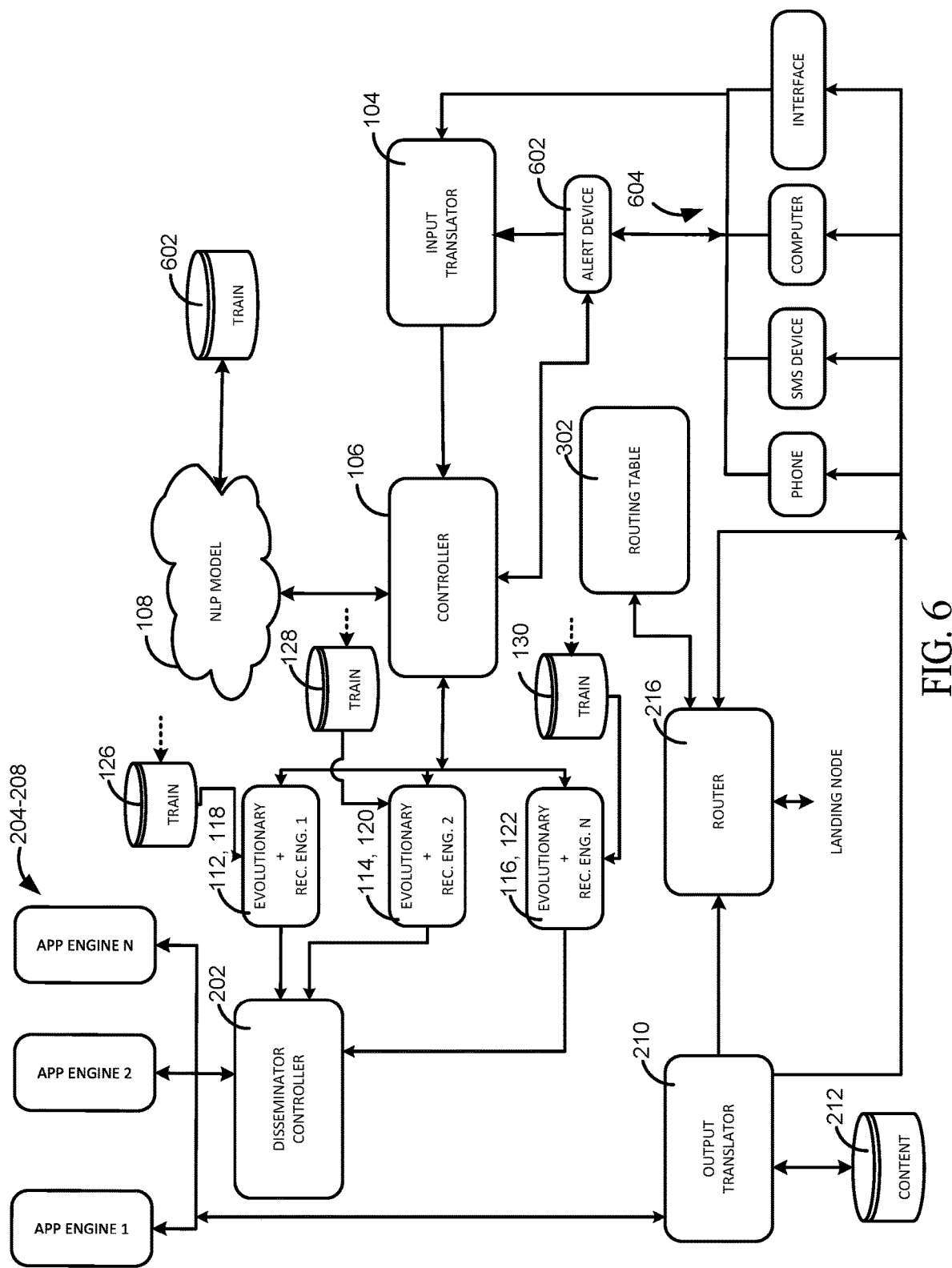
FIG. 6 is an alternate system that emulates human users that engage in conversations with human users.

FIG. 6 is a block diagram of the recognition system that may execute the system functions and process flows described above and shown in FIG. 1-5. In FIG. 6, controller 106 interfaces the natural language processing model 108 and the evolutionary models 118-122 through abstraction layers. The natural language processing model 108 and the evolutionary models 118-122 may be local and/or cloud-based, making the system scalable and easy to migrate to different operating platforms. An input translator 104 through API 102 receives voice frames or segments (e.g., speech that is translated to text by a speech-to-text-synthesis) or text though a phone, short message service (SMS) device, computer, and/or an interface 604. The text is translated into feature sets that are represented by input vectors processed by the natural language processing model 108 and stored in a local or distributed database. In FIG. 6, select words and phrases detected in the input vector by the natural language processing model 108 are marked as designation words and/or designation phrases that uniquely identify evolutionary models 118-122 that are selected by the controller 100 to validate, distill, and in some instances process the recognized and/or unrecognized input.

The disseminator controller 202 receives the evolutionary models 118-122 and/or the natural language processing model 108 recognition results, and in some instances, the input vector and routes them to one or several application engines 204-208. The distributed application engines 204-208 or unitary application engine (not shown) execute and/or coordinate function, tasks, or activities described above in response to and for the benefit of the user. In FIG. 6, the application engines 204-208 consume the recognition results and/or optional input vector and provide application specific content, responses, training data sets, and/or application specific control signals to the output translator 210 that accesses a memory 212 of static and/or dynamic content, and render output via a user interface executed through a phone, an SMS device, a computer and/or an audio and/or video interface 604 shown in FIG. 6. A router 216 may hyperlink the user through the user interfaces to a virtual destination through a routing table 302. To ensure that the evolutionary models 118-122 and natural language models 108 are generated from the best words and phrases, machine learning or deep learning algorithms are used to iteratively train on updated training data passed through the training API 124 and stored in memory 126-130. Further, when a deficiency is detected, controller 110 reports the deficiency by transmitting an alert or setting a flag and/or prompt the user to re-enter the input via the alert device 602 before re-executing the entire recognition event or some portion of the recognition events executed by the recognition engines 112-116, evolutionary models 118-122, and/or the natural language processing model 108.

Figure 7:
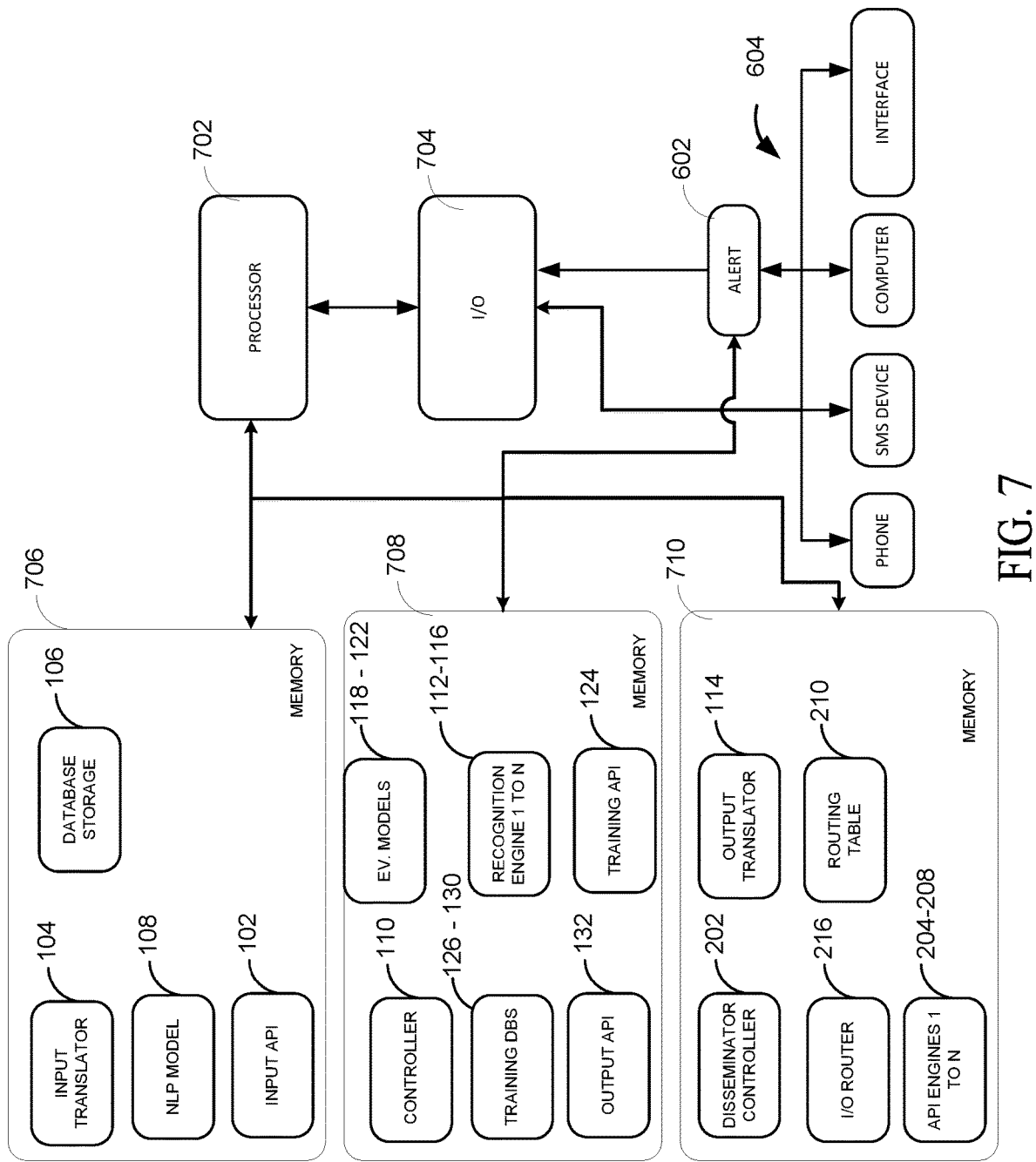
FIG. 7 is an alternate system that emulates human users that engage in conversations with human users.

FIG. 7 is a block diagram of an automatic recognition system that may execute the process flows and system functionality described above and those shown in FIGS. 1-6 automatically. The system comprises a processor 702, a non-transitory media, such as a memory 706-710 (the contents of which are accessible and executable by the processor 702), an alert device 602, and an I/O interface 704. The I/O interface 704 connects devices and points of interaction, such as a phone, an SMS enabled device, a computer and/or an interface 604, to local and/or remote applications, such as, for example, additional local and/or remote recognition services. The memory 706-710 stores instructions, which when executed by the processor 702, causes the components to render some or all of the functionality associated with recognizing speech and/or text and executing an appropriate task or action. The memory 706-710 stores instructions, which when executed by the processor 702, causes the recognition system to render the functionality associated with the input translator 104, natural language processing model 108, input API 102, database storage 106, controller 110, training database 126-130, output API 132, recognition engines 112-116, evolutionary models 118-122, training API 124, disseminator controller 202, I/O router 216, API engines 204-208, output translator 114, and the routing table 210.

The memory 706-710 and/or storage disclosed may retain an ordered listing of executable instructions for implementing the functions described above in a non-transitory computer code. The machine-readable medium may selectively be, but is not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 706-710 may comprise a single device or multiple devices that may be disposed on one or more dedicated memory devices or disposed on a processor or other similar device. The engines may comprise a processor or a portion of a program that executes or supports recognition system or processes. When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "engine" generally refers to a device, processor, and/or program executed by a hardware processor that manages and manipulates data as programmed to execute the functionality associated with the device. Computer-mediated technology enables human communication that occurs through two or more electronic devices. The devices may provide input from various sources including, but not limited to, audio, text, images, video, augmented reality, etc. A session is the time during which a program accepts input and processes information about a particular species. For insurance, it may be the time during which the user transacts an insurance quote rather than the entire time the user is accessing resources on an insurance carrier's site.

While each of the systems and methods shown and described herein operate automatically and operate independently, they also may be encompassed within other systems and methods including any number (N) of iterations of some or all of the process used to recognize input, render recognized results, and/or render an output such as a business classification, for example. Alternate recognition systems may include any combination of structure and functions described or shown in one or more of the FIGS. These recognition systems are formed from any combination of structures and functions described. The structures and functions may process the same, additional, or different input. For example, some alternate systems are rule-based that classify natural or synthesized text into organized groups by using a set of customized linguistic rules. The linguistic rules instruct the recognition system to extract semantically relevant segments of the text (e.g., words, phrases, and surrounding words and phrases to extract context) to identify relevant categories based on its content and its context. Each rule consists of an antecedent or context pattern and a prediction category.

Consider an exchange with an insurance applicant who is not an existing customer of an insurance carrier. This may be determined or verified by the system's credential verification. In this use case, the user demonstrated an unfamiliarity with insurance based on the user's inability to answer common insurance questions during a screening session. The applicant used the term "comprehensive" in multiple exchanges. In analyzing the context, the recentness of a predetermined number of unanswered or misunderstood questions, the confirmation that the user is not a customer of the insurance carrier, and the use of the term "comprehensive", the recognition system recognizes and then associates these contexts as a request for a multiproduct quote for insurance.

If the system processed the term "comprehensive" in isolation, and specifically with respect to automobiles, the term "comprehensive" would be understood to refer to one of three basic insurance coverages. The two other coverages are liability and collision. Collision covers damage to vehicles following a collision (except for collisions with animals)—and comprehensive fills in the gaps (e.g., non-liability and non-animal collision issues) by covering damage to vehicles caused by, for example, storm damage, fire, vandalism, animals, etc. While a recognition of the input alone would determine that the recognition result should be routed to an insurance carrier underwriting vehicles; based on the identified contexts and context associations stored in memory, the rules (and models in a machine learning based system) automatically route the user to an insurance carrier that underwrites a multiproduct line of insurance products.

In this use case, the system learned from exchange and classified the dialogue into two groups, namely, applicants seeking only vehicle quotes, and applicants seeking multiproduct quotes. The system may generate two lists of words that characterize and differentiate each group (e.g., words related only to vehicle insurance, such as additional insured, at fault accident, collision coverage, etc., and words related to multi-product insurance such as copayment/co-insurance, out-of-pocket limits, doctor provider networks, home owner's insurance, life insurance, etc.). The systems transform these lists through a feature extraction that translates each word and phrase list into separate feature sets that are translated into separate training vectors. The vectors represent the frequency of words and phrases within the two exemplary lists.

If the number of multiproduct-related words is greater than the number of vehicle-only-related words, then the input is classified as seeking a multi-product insurance quote rather than only a vehicle insurance quote or a home insurance quote in a rule-based system. If the number of multiproduct-related words is less than the number of vehicle-only-related words, then the input is classified as a request for only a vehicle quote. In a machine-learning application such as each of the machine-learning and deep-learning based systems described herein, the contextual associations reflected in the vectors are automatically returned to the evolutionary models 118-122 via the training API 124 as supplements to the training data set or a replacement training dataset that reflect the contexts and context associations.

Some alternate systems improve recognition using a natural language vocabulary processed by a natural language processing engine, and one or more active grammars processed by an evolutionary engine that process an input through comparisons to the vocabulary and selected active grammars too. In these alternate systems, one or more instances of a natural language engine replace the natural language processing model 108 and one or more instances of the evolutionary engine replace the evolutionary models 118-122. In these alternate systems, select semantically relevant words and phrases (e.g., that express a user's intent and convey contextual meaning) detected in the input vector by the natural language processing engine are marked as designation words and/or designation phrases. Designation words and/or designation phrases uniquely identify one or more evolutionary engine instances and/or one or more active grammars processed by the evolutionary engine instances selected by the controller 100 to validate, distill, and further process the input vector and/or the natural language model's intents and sub-entity recognition results. An active grammar is a file that contains the list of words and phrases to be recognized by the evolutionary engine instances. Active grammars may also include programming logic to aid the disseminator controller 202 and/or application engines 204-208.

In a first pass, the natural language processing engine receives the unstructured input populated by a spoken utterance, a textual input, etc. The input is stored and translated into the input vector before being further processed. The natural language processing engine compares the processed input to a vocabulary that comprises the total list of words and phrases that are recognized by the speech engine. A vocabulary comprises all of the active grammars recognized by the evolutionary engine instances and more. Because the total list of words that are recognized by the natural language processing engine include all of the designation words and/or designation phrases that are each associated with or are each linked to one or more evolutionary engines and/or all of the corresponding active grammars, the vocabulary is the largest list of words and phrases recognized by the system.

In this alternate system, controller 110 receives the natural language processing engine's recognition results and selects one, two, or more active grammars and/or evolutionary engine instances that further process the input vector and/or the natural language processing engine intents and sub-entity recognition results. The evolutionary engine instances process the natural language processing engine's recognition results and/or input vector and render recognition results comprising intents and sub-entities recognition results that are transmitted to the disseminator controller 202 and in some instances, transmitted with the input vector. Because some intents and sub-entity recognition results (and models used in the deep-learning approach) include origination sources and/or intended designations, some systems do not track states allowing the systems to process input from any source and deliver results to any desired designation without referencing a log.

In yet another alternate, the multi-pass recognitions described above that comprise the natural language processing models 108 and engines, recognition engines 112-116, and evolutionary models 118-122 and engines are consolidated and executed on one recognition engine that loads and independently enables and disables the functionality described above including grammars and vocabularies to achieve the recognition result. Since the enablement and disablement occurs independently, the recognition system preserves processing resources by enabling functionality only when it is needed. In yet another alternate system, the vectors are represented by one or more-byte sequence or are used to generate one or more images that are processed by recurrent neural networks and convolutional neural networks, respectively that execute some or all of the recognition functionality described herein.

The functions, acts or tasks illustrated in the FIGS. or described herein may be executed in response to one or more sets of logic or instructions stored in or on non-transitory computer readable media as well. The functions, acts, or tasks are independent of the particular type of instructions set, storage media, processor or processing strategy, and may be performed by software, hardware, integrated circuits, firmware, micro code and the like, operating alone or in combination.

The disclosed system uses biometrics to recognize characteristics conveyed in messages and/or speech. The systems and methods derive insights from free-form input and generate and train models, such as classification models. The system translates natural and/or synthesized text into feature groups that are processed by the models. The recognition may comprise a recognition of a request or a response to an inquiry, such as a request for a composite classification.

The automatic recognition systems and processes simulate human dialogue. The systems and processes learn user preferences and provide users with suggestions, such as to how to navigate insurance-based channels. Segmentations generate the predictions that provide access to insurance underwriters, for example.

The subject-matter of the disclosure may also relate, among others, to the following aspects (referenced by numbers):

1. A system that determines a classification by simulating a human user comprising;

a translator that translates an input segment to an output segment and represents a frequency of words and phrases in the output segment as an input vector;

a natural language processing engine that processes the input vector and generates a plurality of intents and a plurality of sub-entities;

a plurality of recognition engines hosting one or more evolutionary models that process the plurality of intents and the plurality of sub-entities to generate a second plurality of intents and a second plurality of sub-entities that represent a species classification; and where the natural language processing engine selects an instance of an evolutionary model of the one or more evolutionary models as a result of a recognition of one or more predefined semantically relevant words and phrases that the natural language processing engine detected in the input vector.

2. The system of aspect 1 where the plurality of recognition engines loads two or more instances of the one or more evolutionary models actuated by a controller as a result of a recognition engine failure.

3. The system of aspect 1 where the plurality of recognition engines loads two or more instances of the one or more evolutionary models actuated by a controller.

4. The system of any of aspects 1 to 3 where the one or more evolutionary models is actuated as a result of an availability of a plurality post-processing applications.

5. The system of any of aspects 1 to 4 where the one or more evolutionary models is actuated as a result of a plurality of sub-classifications made from a hierarchical classification model.

6. The system of any of aspects 1 to 5 where the one or more evolutionary models is iteratively trained on a supplemental training dataset automatically generated by a plurality of post-processing application engines.

7. The system of aspect 6 where the supplemental training dataset is vectorized and a plurality of scalar functions of a training vector are adjusted by a weighting function.

8. The system of aspect 6 where the plurality of post-processing application engines comprises an insurance quoting system, an insurance claims processing system, or an on-line insurance servicing system.

9. The system of any of aspects 1 to 8 further comprising a plurality of post-processing application engines that consume the second plurality of intents and the second plurality of sub-entities when selected by a controller and where the controller selects the plurality of post-processing application engines in response to an analysis of a plurality of contexts of the input vector.

10. The system of aspect 9 where the plurality of post-processing application engines identifies a business classification associated with a free-form input that is translated into a textual segment.

11. A method that determines a classification by simulating a human user comprising;

translating an input segment by a translator to an output segment;

representing a frequency of words and phrases in the output segment as an input vector;

processing by a natural language processing engine the input vector and generating a plurality of intents and a plurality of sub-entities;

processing the plurality of intents and the plurality of sub-entities by a plurality of recognition engines hosting one or more evolutionary models;

generating a second plurality of intents and a second plurality of sub-entities that represent a species classification; and selecting an instance of an evolutionary model of the one or more evolutionary models as a result of a recognition of one or more predefined semantically relevant words and phrases that the natural language processing engine detected in the input vector.

12. The method of aspect 11 further comprising loading two or more instances of the one or more evolutionary models actuated by a controller as a result of a recognition engine failure.

13. The method of aspect 11 further comprising loading two or more instances of the one or more evolutionary models actuated by a controller as a result of an evolutionary model failure.

14. The method of any of aspects 11 to 13 further comprising actuating the one or more evolutionary models in response to an availability of a plurality of post-processing applications.

15. The method of any of aspects 11 to 14 further comprising actuating the one or more evolutionary models in response to a plurality of sub-classifications made in a hierarchical classification model.

16. The method of any of aspects 11 to 15 further comprising iteratively training the one or more evolutionary models on a supplemental training dataset automatically generated by a plurality of post-processing application engines.

17. The method of aspect 16 further comprising vectorizing the supplemental training dataset and modifying a plurality of scalar functions of a training vector by a weighting function.

18. The method of aspect 16 where the plurality of post-processing application engines comprises an insurance quoting system, an insurance claims processing system, and an on-line insurance servicing system.

19. The method of aspect 16 further comprising consuming the second plurality of intents and the second plurality of sub-entities by a plurality of post-processing application engines in response to an analysis of a plurality of contexts of the input vector.

20. The method of aspect 19 where the plurality of post-processing application engines identifies a business classification associated with a free-form input that is translated into a textual segment.

21. A non-transitory machine-readable medium encoded with machine-executable instructions, where execution of the machine-executable instructions is for:
    translating an input segment by a translator to an output segment;
    representing a frequency of words and phrases in the output segment as an input vector;
    processing by a natural language processing engine the input vector and generating a plurality of intents and a plurality of sub-entities;
    processing a plurality of intents and a plurality of sub-entities by a plurality of recognition engines hosting one or more evolutionary models;
    generating a second plurality of intents and a second plurality of sub-entities that represent a species classification; and
    selecting an instance of an evolutionary model of the one or more evolutionary models as a result of a recognition of one or more predefined semantically relevant words and phrases that the natural language processing engine detected in the input vector.

22. The non-transitory machine-readable medium of aspect 21 further comprising loading two or more instances of the one or more evolutionary models actuated by a controller as a result of a recognition engine failure.

23. The non-transitory machine-readable medium of aspect 21 further comprising loading two or more instances of the one or more evolutionary models actuated by a controller.

24. The non-transitory machine-readable medium of any of aspects 21 to 23 further comprising actuating the one or more evolutionary models in response to an availability of a plurality of post-processing applications.

25. The non-transitory machine-readable medium of any of aspects 21 to 24 further comprising actuating the one or more evolutionary models in response to a number of sub-classifications made in a hierarchical classification model.

26. The non-transitory machine-readable medium of any of aspects 21 to 25 further comprising iteratively training the one or more evolutionary models on a supplemental training dataset automatically generated by a plurality of post-processing application engines.

27. The non-transitory machine-readable medium of aspect 26 further comprising vectorizing a supplemental training dataset and modifying a plurality of scalar functions of a training vector by a weighting function.

28. The non-transitory machine-readable medium of claim 26 where the plurality of post-processing application engines comprises an insurance quoting system, an insurance claims processing system, and an on-line insurance servicing system.

29. The non-transitory machine-readable medium of claim 26 further comprising consuming the second plurality of intents and a second plurality of sub-entities by a plurality of post-processing application engines in response to an analysis of a plurality of contexts of the input vector.

30. The non-transitory machine-readable medium of claim 29 where the plurality of post-processing application engines identifies a business classification associated with a free-form input that is translated into a textual segment.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that determines a classification by simulating a human user comprising;
    a translator that translates an input segment to an output segment and represents a frequency of words and phrases in the output segment as an input vector;
    a natural language processing engine that processes the input vector and generates a plurality of intents and a plurality of sub-entities;
    a plurality of recognition engines hosting one or more evolutionary models that process the plurality of intents and the plurality of sub-entities to generate a second plurality of intents and a second plurality of sub-entities that represent a species classification;
    a plurality of application engines that process the plurality of intents, the plurality of sub-entities, the second plurality of intents, and the second plurality of sub-entities, and render an identifying output;
    where the plurality of application engines automatically render a plurality of vectors and a plurality of textual associations and associate the plurality of vectors and the plurality of textual associations with a free-form input to the one or more evolutionary models when the identifying output is rejected; and
    where the natural language processing engine selects an instance of an evolutionary model of the one or more evolutionary models as a result of a recognition of one or more predefined semantically relevant words and phrases that the natural language processing engine detected in the input vector.

2. The system of claim 1 where the plurality of recognition engines loads two or more instances of the one or more evolutionary models actuated by a controller as a result of a recognition engine failure.

3. The system of claim 1 where the plurality of recognition engines loads two or more instances of the one or more evolutionary models actuated by a controller.

4. The system of claim 1 where the one or more evolutionary models is actuated as a result of a plurality post-processing applications.

5. The system of claim 1 where the one or more evolutionary models is actuated as a result of a plurality of sub-classifications made from a hierarchical classification model.

6. The system of claim 1 where the one or more evolutionary models is iteratively trained on a supplemental training dataset automatically generated by a plurality of post-processing application engines.

7. The system of claim 6 where the supplemental training dataset is vectorized and a plurality of scalar functions of a training vector are adjusted by a weighting function.

8. The system of claim 6 where the plurality of post-processing application engines comprises an insurance quoting system, an insurance claims processing system, or an on-line insurance servicing system.

9. The system of claim 1 further comprising a plurality of post-processing application engines that consume the second plurality of intents and the second plurality of sub-entities when selected by a controller and where the controller selects the plurality of post-processing application engines in response to an analysis of a plurality of contexts of the input vector.

10. The system of claim 9 where the plurality of post-processing application engines identifies a business classification associated with a free-form input that is translated into a textual segment.

11. A method that determines a classification by simulating a human user comprising;
    translating an input segment by a translator to an output segment;
    representing how often words and phrases appear in the output segment by an input vector;
    processing by a natural language processing engine the input vector to generate a plurality of intents and a plurality of sub-entities;
    processing the plurality of intents and the plurality of sub-entities by a plurality of recognition engines hosting the one or more evolutionary models;
    generating a second plurality of intents and a second plurality of sub-entities by the plurality of recognition engines that represent a species classification;
    selecting an instance of an evolutionary model of the one or more evolutionary models as a result of a recognition of one or more predefined semantically relevant words and phrases that the natural language processing engine detected in the input vector;
    processing the plurality of intents, the plurality of sub-entities, the second plurality of intents, and the second plurality of sub-entities by a plurality of application engines render an identifying output;
    rendering a plurality of vectors and a plurality of textual associations and associating the plurality of vectors and the plurality of textual associations with a free-form input to the one or more evolutionary models when the identifying output is rejected.

12. The method of claim 11 further comprising loading two or more instances of the one or more evolutionary models actuated by a controller as a result of a recognition engine failure.

13. The method of claim 11 further comprising loading two or more instances of the one or more evolutionary models actuated by a controller as a result of an evolutionary model failure.

14. The method of claim 11 further comprising actuating the one or more evolutionary models in response to an availability of a plurality of post-processing applications.

15. The method of claim 11 further comprising actuating the one or more evolutionary models in response to a plurality of sub-classifications made in a hierarchical classification model.

16. The method of claim 11 further comprising iteratively training the one or more evolutionary models on a supplemental training dataset automatically generated by a plurality of post-processing application engines.

17. The method of claim 16 further comprising vectorizing the supplemental training dataset and modifying a plurality of scalar functions of a training vector by a weighting function.

18. The method of claim 16 where the plurality of post-processing application engines comprises an insurance quoting system, an insurance claims processing system, and an on-line insurance servicing system.

19. The method of claim 16 further comprising consuming the second plurality of intents and the second plurality of sub-entities by a plurality of post-processing application engines in response to an analysis of a plurality of contexts of the input vector.

20. The method of claim 19 where the plurality of post-processing application engines identifies a business classification associated with a free-form input that is translated into a textual segment.

21. A system that determines a classification by simulating a human user comprising;
    a translator that translates an input segment to an output segment and represents a frequency of words and phrases in the output segment as an input vector;
    a natural language processing engine that processes the input vector and generates a plurality of intents and a plurality of sub-entities;
    a plurality of recognition engines hosting one or more evolutionary models that process the plurality of intents and the plurality of sub-entities to generate a second plurality of intents and a second plurality of sub-entities that represent a species classification;
    a plurality of application engines that process the plurality of intents, the plurality of sub-entities, the second plurality of intents, and the second plurality of sub-entities, and render an identifying output;
    where the plurality of application engines automatically render a plurality of vectors and a plurality of textual associations and associate the plurality of vectors and the plurality of textual associations with a free-form input to the one or more evolutionary models when the identifying output is rejected; and
    where the natural language processing engine selects an instance of an evolutionary model of the one or more evolutionary models as a result of a recognition of one or more predefined semantically relevant words and phrases that the natural language processing engine detected in the input vector;
    where the species classification ranks below a genus classification or a subgenus classification in a domain.

* * * * *